(12) United States Patent
Yoshida et al.

(10) Patent No.: US 11,841,564 B2
(45) Date of Patent: Dec. 12, 2023

(54) DISPLAY DEVICE

(71) Applicant: Shanghai Tianma Micro-Electronics Co., Ltd., Shanghai (CN)

(72) Inventors: Hitoshi Yoshida, Kanagawa (JP); Akira Banjouya, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/856,115

(22) Filed: Jul. 1, 2022

(65) Prior Publication Data

US 2023/0015959 A1    Jan. 19, 2023

(30) Foreign Application Priority Data

Jul. 15, 2021   (JP) .................................. 2021-117075
Mar. 24, 2022   (JP) .................................. 2022-048483

(51) Int. Cl.
*G02F 1/13* (2006.01)
*G02F 1/01* (2006.01)

(52) U.S. Cl.
CPC .......... *G02F 1/1306* (2013.01); *G02F 1/0121* (2013.01); *G02F 2203/48* (2013.01)

(58) Field of Classification Search
None
See application file for complete search history.

(56) References Cited

U.S. PATENT DOCUMENTS

2014/0036339 A1* 2/2014 Tonar ................ B32B 27/36
359/267

FOREIGN PATENT DOCUMENTS

JP     2008-209764 A    9/2008

* cited by examiner

*Primary Examiner* — Ashok Patel
(74) *Attorney, Agent, or Firm* — Sughrue Mion, PLLC

(57) ABSTRACT

A display device includes a liquid crystal display including a first liquid crystal display panel that displays a character or an image; a decorative member; and a controller that controls the display of the liquid crystal display. The decorative member is disposed on a display surface side of the liquid crystal display, and includes a display region in which the display of the liquid crystal display is transparently displayed, and a non-display region adjacent to the display region. The controller controls a luminance through the decorative member of a black display of the liquid crystal display to a luminance invisible to a user, and controls the luminance through the decorative member of a low-gradation region, except for the black display, of the liquid crystal display to a luminance visible to the user.

9 Claims, 12 Drawing Sheets

DISPLAY DEVICE

CROSS-REFERENCE TO RELATED APPLICATION

This application claims the benefit of Japanese Patent Application No. 2021-117075, filed on Jul. 15, 2021, and Japanese Patent Application No. 2022-048483, filed on Mar. 24, 2022, of which the entirety of the disclosures is incorporated by reference herein.

FIELD

The present disclosure relates generally to a display device.

BACKGROUND

In the related art, liquid crystal display devices are known in which a light-transmitting decorative member is disposed on a display surface side of a liquid crystal display panel to improve design. In a liquid crystal display device in which a decorative member is disposed, a user observes the display of the liquid crystal display panel through the decorative member and, as such, displays of low-gradation regions are difficult to see. However, when, for example, the luminance of a back light is increased in order to make displays of low-gradation regions easier to see, the luminance of a black display of the liquid crystal display panel increases. As a result, the user visually recognizes a boundary, in the decorative member, between a region in which the display of the liquid crystal display panel is displayed (display region) and a region in which the display of the liquid crystal display panel is not displayed (non-display region), and the design effect of the liquid crystal display panel decreases.

As such, in order to prevent visual recognition of the boundary between the display region and the non-display region, Unexamined Japanese Patent Application Publication No. 2008-209764 describes a liquid crystal display device including a liquid crystal display panel that includes a non-display region around a display region, a first light-transmitting member that is disposed on a front surface side of the liquid crystal display panel and that is formed from a dark color material, and a second light-transmitting member that is disposed on a back surface side of the liquid crystal display panel. In Unexamined Japanese Patent Application Publication No. 2008-209764, a light-blocking layer is provided in a region, of the light-transmitting member, that corresponds to the non-display region, and a gradation layer is provided in a region, of the light-transmitting member, that corresponds to the periphery of the display region. Due to this configuration, the boundary line between the display region and the non-display region of the liquid crystal display panel is prevented from being visually recognized by the user.

With the liquid crystal display device of Unexamined Japanese Patent Application Publication No. 2008-209764, the gradation layer is provided in the region that corresponds to the periphery of the display region and, as such, the display in the periphery of the display region is darker and the visibility of the display is reduced.

SUMMARY

A display device of the present disclosure includes:
a liquid crystal display including a first liquid crystal display panel that displays a character or an image;
a decorative member that is disposed on a display surface side of the liquid crystal display, and includes a display region in which a display of the liquid crystal display is transparently displayed and a non-display region adjacent to the display region; and
a controller that controls the display of the liquid crystal display, wherein
the controller controls a luminance through the decorative member of a black display of the liquid crystal display to a luminance invisible to a user, and controls the luminance through the decorative member of a low-gradation region, except for the black display, of the liquid crystal display to a luminance visible to the user.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which.

DETAILED DESCRIPTION

Hereinafter, a display device according to various embodiments is described while referencing the drawings.

Embodiment 1

Figure 1:
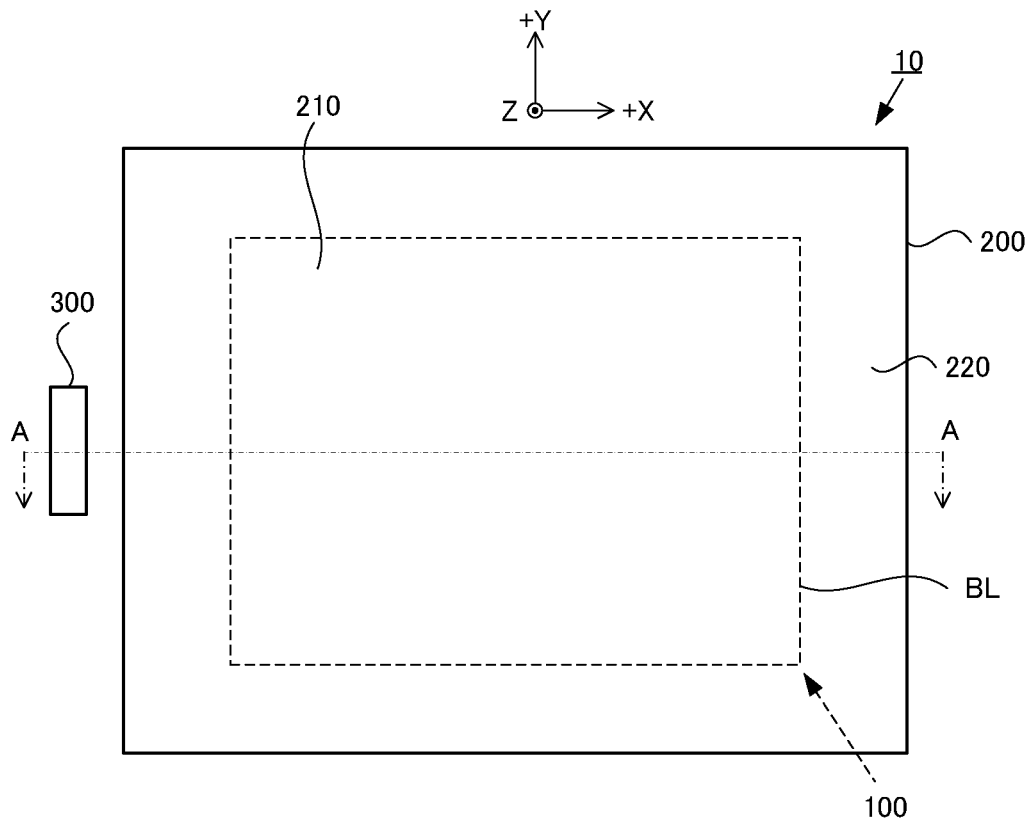
FIG. 1 is a plan view illustrating a display device according to Embodiment 1.
Figure 2:
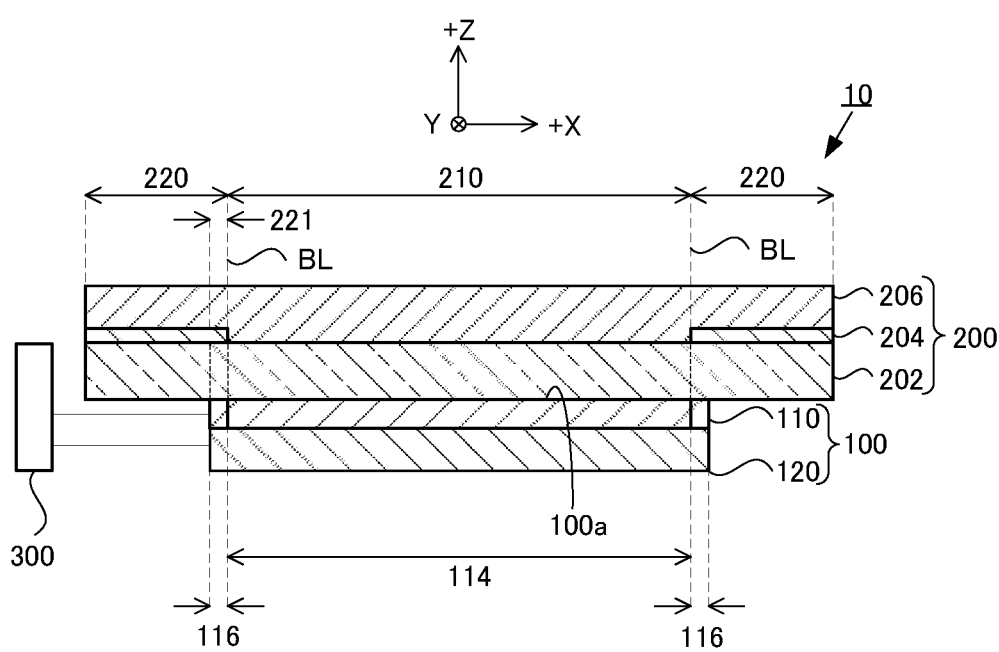
FIG. 2 is a cross-sectional view of the display device illustrated in FIG. 1, taken along line A-A.

A display device 10 according to the present embodiment is described while referencing FIGS. 1 to 5. As illustrated in FIGS. 1 and 2, the display device 10 includes a liquid crystal display 100, a decorative member 200, and a controller 300. The liquid crystal display 100 displays characters or images. The decorative member 200 transparently displays a display of the liquid crystal display 100. The decorative member 200 includes a display region 210 in which the display of the liquid crystal display 100 is transparently displayed, and a non-display region 220 adjacent to the display region 210. The controller 300 controls the display of the liquid crystal display 100.

The display device 10 is provided on a dashboard of a vehicle, a piece of furniture, a home electronic device, or the like. Note that, in the present description, to facilitate comprehension, in the display device 10 of FIG. 1, the longitudinal right direction (the right direction on paper) is referred to as the "+X direction", the up direction (the up direction on paper) is referred to as the "+Y direction", and the direction perpendicular to the +X direction and the +Y direction (the front direction on paper) is referred to as the "+Z direction."

The liquid crystal display 100 of the display device 10 is a transmissive liquid crystal display device that displays characters or images. The liquid crystal display 100 is adhered to the decorative member 200. As illustrated in FIG. 2, the liquid crystal display 100 includes a first liquid crystal display panel 110 and a back light 120.

Figure 3:
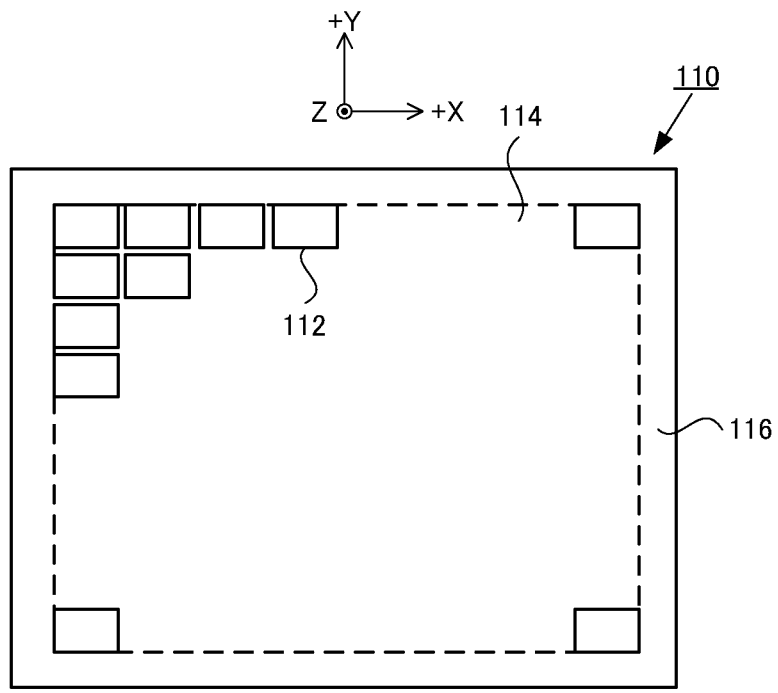
FIG. 3 is a plan view illustrating a first liquid crystal display panel according to Embodiment 1.
Figure 4:
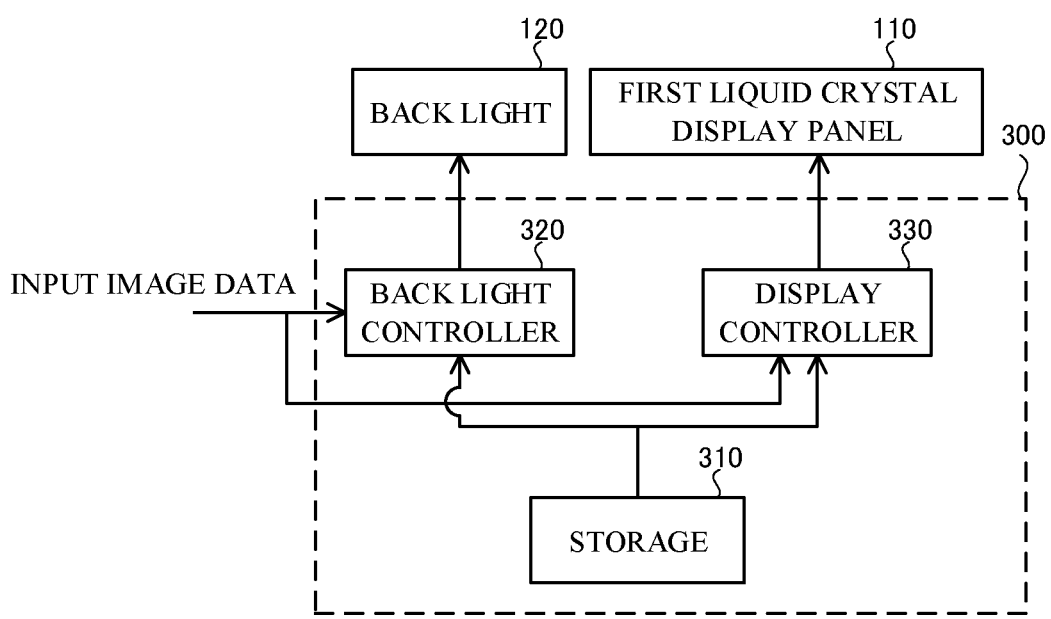
FIG. 4 is a block diagram illustrating the configuration of a controller according to Embodiment 1.

In one example, the first liquid crystal display panel 110 of the liquid crystal display 100 is a horizontal electric field type liquid crystal display panel that is active matrix driven by thin film transistors (TFT). The first liquid crystal display panel 110 displays characters or images. As illustrated in FIG. 3, the first liquid crystal display panel 110 includes a displayable region 114 in which main pixels 112 are arranged in a matrix, and a frame region 116 in which wiring, a drive circuit, and the like are disposed. The frame region 116 surrounds the displayable region 114. The displayable region 114 is a region that is capable of displaying characters, images, and the like. The frame region 116 is a region that is incapable of displaying characters, images, and the like. In the present embodiment, as illustrated in FIG. 2, the displayable region 114 corresponds to the display region 210 of the decorative member 200.

As illustrated in FIG. 2, the back light 120 of the liquid crystal display 100 is arranged on a back surface side (the −Z side) of the first liquid crystal display panel 110. In one example, the back light 120 is implemented as a direct back light. The back light 120 includes a white light emitting diode (LED), a reflective sheet, a diffusion sheet, a lighting circuit, and the like (all not illustrated in the drawings). In the present embodiment, the back light 120 emits light of a uniform luminance on the first liquid crystal display panel 110.

The decorative member 200 of the display device 10 is a member that transmits light and that provides design to the user. The decorative member 200 has a flat-plate shape, and is disposed on a display surface 100a side of the liquid crystal display 100. As illustrated in FIG. 2, the decorative member 200 includes a light-transmitting cover 202, a light blocking layer 204, and a decoration layer 206.

The light-transmitting cover 202 of the decorative member 200 is a light-transmitting flat plate. In one example, the light-transmitting cover 202 is formed from a synthetic resin. The display surface 100a of the liquid crystal display 100 is adhered to the light-transmitting cover 202. The transmittance of the decorative member 200 can be adjusted by adjusting the transmittance of the light-transmitting cover 202. Moreover, reflection of display light that occurs at the interface between the decorative member 200 and the liquid crystal display 100 can be suppressed by adjusting the refractive index of the light-transmitting cover 202.

The light blocking layer 204 of the decorative member 200 is provided on (on the +Z side) of the light-transmitting cover 202. The light blocking layer 204 defines the display region 210 and blocks the display light emitted from the liquid crystal display 100. In one example, the light blocking layer 204 is printed on the light-transmitting cover 202 using black ink.

The decoration layer 206 of the decorative member 200 is a layer that provides design to the user. The decoration layer 206 covers the light blocking layer 204 and is formed on the light-transmitting cover 202. In one example, the decoration layer 206 is formed by printing, in a desired color, a desired pattern such as a wood grain, a marble, or a geometric pattern.

As illustrated in FIGS. 1 and 2, the decorative member 200 includes the display region 210 and the non-display region 220. The display region 210 corresponds to the displayable region 114 of the liquid crystal display 100. The display of the liquid crystal display 100 is transparently displayed in the display region 210. The non-display region 220 is positioned outside the display region 210 and is adjacent to the display region 210. The non-display region 220 includes a region 221 that corresponds to the frame region 116 of the first liquid crystal display panel 110. The non-display region 220 is a region in which the display of the liquid crystal display 100 is not displayed.

The controller 300 of the display device 10 controls the display of the first liquid crystal display panel 110 and the luminance of the back light 120 to control the luminance through the decorative member 200 of a $1^{st}$ gradation of the liquid crystal display 100 to a minimum luminance Lmin visible to the user. Additionally, the controller 300 controls the luminance through the decorative member 200 of a black display ($0^{th}$ gradation) of the liquid crystal display 100 to a luminance Lu invisible to the user.

Here, the phrase "the minimum luminance Lmin visible to the user" refers to a luminance at which the user begins to see the display of the liquid crystal display 100 through the decorative member 200. The phrase "the luminance Lu invisible to the user" refers to a luminance that is greater than or equal to the luminance (reflection luminance) of the non-display region 220 of the decorative member 200 and that is less than the minimum luminance Lmin visible to the user. The minimum luminance Lmin visible to the user and the luminance Lu invisible to the user are dependent on the use environment of the display device 10. In one example, the minimum luminance Lmin visible to the user is from 0.09 cd/m$^2$ to 70 cd/m$^2$. In the present embodiment, the luminance Lu invisible to the user is set as the luminance of the non-display region 220 of the decorative member 200. Additionally, the minimum luminance Lmin visible to the user and the luminance of the non-display region 220 of the decorative member 200 are measured in advance in accordance with the use environment of the display device 10, and are stored in advance in a storage 310.

The controller 300 includes a storage 310, a back light controller 320, and a display controller 330.

The storage 310 of the controller 300 stores first gradation-luminance data expressing the relationship between the gradation and the luminance of the first liquid crystal display panel 110, the minimum luminance Lmin visible to the user, and the luminance of the non-display region 220 of the decorative member 200. The first gradation-luminance data is measured in advance. Additionally, the storage 310 stores programs, data, and the like that cause the back light controller 320 and the display controller 330 to function.

The back light controller 320 of the controller 300 controls the luminance of the back light 120 on the basis of the first gradation-luminance data and the luminance of the non-display region 220 of the decorative member 200 stored in the storage 310. The back light controller 320 controls the luminance of the back light 120 to a luminance at which the luminance through the decorative member 200 of the black display of the first liquid crystal display panel 110 and the luminance of the non-display region 220 of the decorative member 200 are equal. The back light controller 320 sends, to a lighting circuit of the back light 120, a back light control signal expressing the luminance of the back light 120. The back light 120 lights on the basis of the sent back light control signal.

Figure 5:
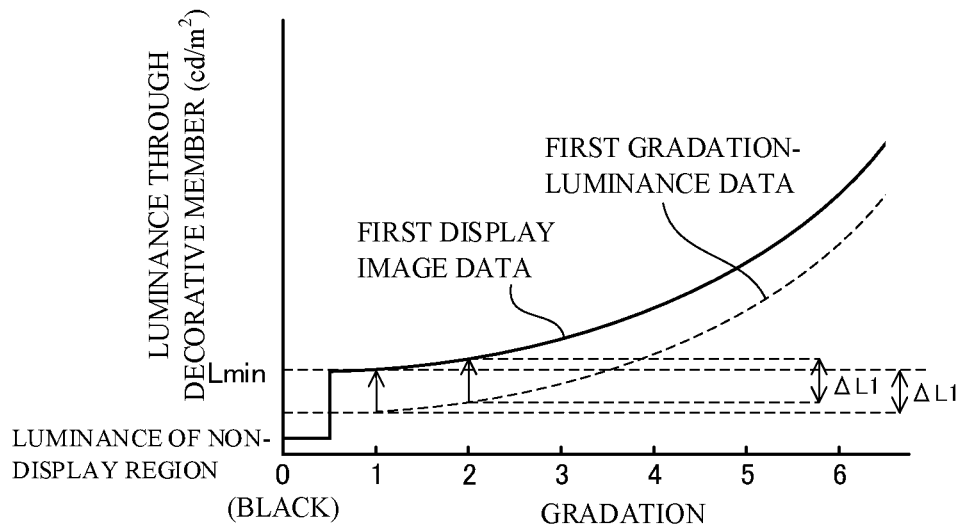
FIG. 5 is a drawing illustrating a luminance through a decorative member according to Embodiment 1.

The display controller 330 of the controller 300 generates, from input image data, first display image data to be displayed on the first liquid crystal display panel 110. This generation is performed on the basis of the first gradation-luminance data and the minimum luminance Lmin visible to the user stored in the storage 310. Specifically, as illustrated in FIG. 5, the display controller 330 increases the luminance value of the $1^{st}$ gradation in the first gradation-luminance data to the minimum luminance Lmin visible to the user, and increases the luminance value of each of the $2^{nd}$ gradation and later in the first gradation-luminance data an increased amount (difference between the minimum luminance Lmin and the luminance value of the $1^{st}$ gradation in the first gradation-luminance data) ΔL1 of the luminance value of the $1^{st}$ gradation to generate the first display image data from the input image data. As a result, the luminance through the decorative member 200 of the $1^{st}$ gradation and later of the first liquid crystal display panel 110 is greater than or equal to the minimum luminance Lmin visible to the user. Note that FIG. 5 illustrates the relationship between portions of the gradation and the luminance.

The display controller 330 sends a first display image signal expressing the generated first display image data to a driver circuit (not illustrated in the drawings) of the first liquid crystal display panel 110. The first liquid crystal display panel 110 displays characters, images, or the like on the basis of the sent first display image signal.

In the present embodiment, the controller 300 controls the luminance through the decorative member 200 of the black display (the $0^{th}$ gradation) of the first liquid crystal display panel 110 to the luminance of the non-display region 220 of the decorative member 200, and controls the luminance through the decorative member 200 of the $1^{st}$ gradation and later of the first liquid crystal display panel 110 to the minimum luminance Lmin visible to the user or greater. Due to these configurations, the black display (the $0^{th}$ gradation) of the first liquid crystal display panel 110 is not visible to the user and the displays of the $1^{st}$ gradation and later of the first liquid crystal display panel 110 are visible to the user.

Accordingly, the display device 10 can make a boundary BL between the display region 210 and the non-display region 220 less visible without reducing the visibility of the display.

The controller 300 is configured from a central processing unit (CPU), a memory, and the like. In one example, the CPU executes programs stored in the memory to realize the functions of the controller 300.

As described above, the controller 300 sets the luminance through the decorative member 200 of the black display (the $0^{th}$ gradation) to the luminance of the non-display region 220 of the decorative member 200, and sets the luminance through the decorative member 200 of the $1^{st}$ gradation and later to the minimum luminance Lmin visible to the user or greater. As such, the display device 10 can make the boundary BL between the display region 210 and the non-display region 220 less visible without reducing the visibility of the display.

Embodiment 2

In Embodiment 1, the back light 120 emits light of a uniform luminance on the first liquid crystal display panel 110. However, a configuration is possible in which the back light 120 emits light by region on a plurality of regions of the first liquid crystal display panel 110 (local dimming).

As with the display device 10 of Embodiment 1, the display device 10 of the present embodiment includes a liquid crystal display 100, a decorative member 200, and a controller 300. The configuration of the decorative member 200 of the present embodiment is the same as the decorative member 200 of Embodiment 1 and, as such, the liquid crystal display 100 and the controller 300 of the present embodiment are described.

As with the liquid crystal display 100 of Embodiment 1, the liquid crystal display 100 of the present embodiment includes a first liquid crystal display panel 110 and a back light 120.

Figure 6:
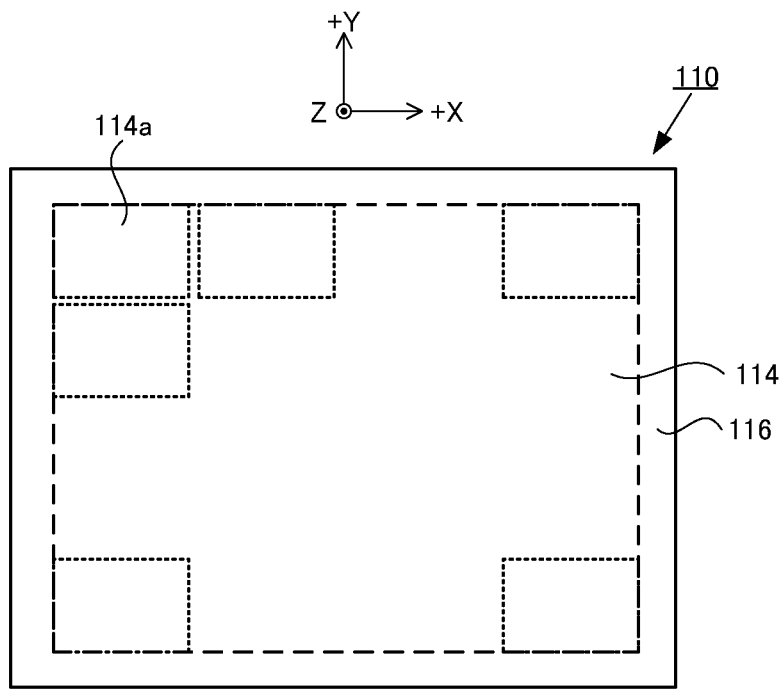
FIG. 6 is a plan view illustrating a first liquid crystal display panel according to Embodiment 2.

As illustrated in FIG. 6, in the first liquid crystal display panel 110 of the present embodiment, a displayable region 114 is divided into a plurality of regions 114a. The other configurations of the first liquid crystal display panel 110 of the present embodiment configuration are the same as the configurations of the first liquid crystal display panel 110 of Embodiment 1. Note that the regions 114a may be formed from a plurality of main pixels 112, or may be formed from one main pixel 112.

Figure 7:
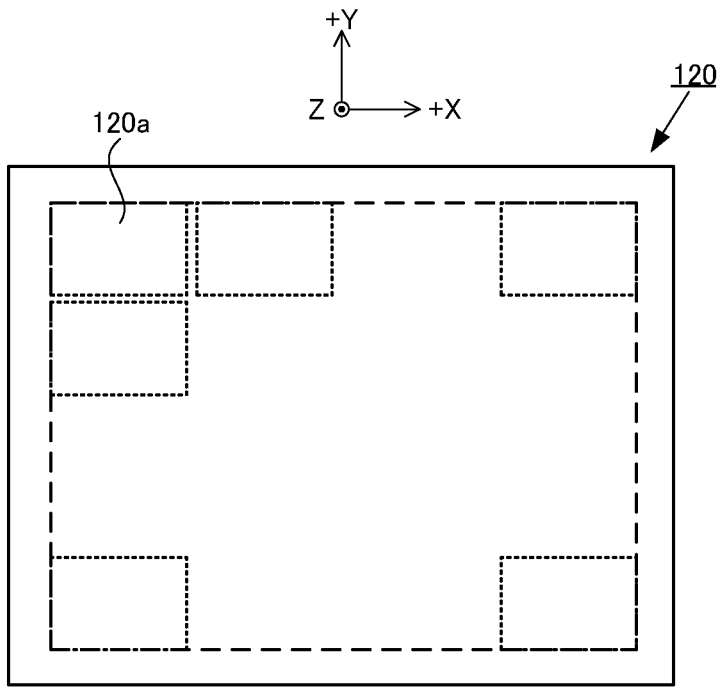
FIG. 7 is a plan view illustrating a back light according to Embodiment 2.

As illustrated in FIG. 7, the back light 120 of the present embodiment includes a plurality of emission regions 120a that respectively correspond to the regions 114a of the first liquid crystal display panel 110. Each of the emission regions 120a emits light on a corresponding region 114a. In the back light 120 of the present embodiment, in one example, one or a plurality of white LED elements is disposed in each of the emission regions 120a. The other configurations of the back light 120 of the present embodiment are the same as the configurations of the back light 120 of Embodiment 1.

As with the controller 300 of Embodiment 1, the controller 300 of the present embodiment includes a storage 310, a back light controller 320, and a display controller 330. The storage 310 of the present embodiment is the same as the storage 310 of Embodiment 1 and, as such, the back light controller 320 and the display controller 330 of the present embodiment are described.

The back light controller 320 of the present embodiment controls the luminance of the back light 120 by emission region 120a on the basis of input image data, first gradation-luminance data, and the luminance of a non-display region 220 of the decorative member 200 (local dimming processing). Specifically, the back light controller 320 of the present embodiment controls the luminance of the light, emitted from the emission regions 120a corresponding to the regions 114a that include the main pixels 112, of the first liquid crystal display panel 110, that display black, to a luminance at which the luminance through the decorative member 200 of the black display of the first liquid crystal display panel 110 and the luminance of the non-display region 220 of the decorative member 200 are equal. That is, the back light controller 320 of the present embodiment controls the luminance of the light emitted on the main pixels 112, of the first liquid crystal display panel 110, that display black to a luminance at which the luminance through the decorative member 200 of the black display of the first liquid crystal display panel 110 and the luminance of the non-display region 220 of the decorative member 200 are equal.

The back light controller 320 of the present embodiment may set the luminance of the light, emitted from the emission regions 120a corresponding to the main pixels 112, of the first liquid crystal display panel 110, that display black to zero. That is, a configuration is possible in which the emission regions 120a corresponding to the main pixels 112, of the first liquid crystal display panel 110, that display black do not emit light.

Additionally, the back light controller 320 of the present embodiment controls the luminance of the emission regions 120a corresponding to the regions 114a other than the regions 114a that include the main pixels 112, of the first liquid crystal display panel 110, that display black to a luminance that corresponds to the display of the first liquid crystal display panel 110.

As with the display controller 330 of Embodiment 1, the display controller 330 of the present embodiment generates first display image data to be displayed on the first liquid crystal display panel 110. As with the display controller 330 of Embodiment 1, the display controller 330 of the present embodiment increases the luminance of the $1^{st}$ gradation in the first gradation-luminance data to the minimum luminance Lmin visible to the user to generate the first display image data. Additionally, the display controller 330 of the present embodiment increases the luminance value of each of the $2^{nd}$ gradation and later in the input image data an increased amount ΔL1 of the luminance value of the $1^{st}$ gradation to generate the first display image data.

In the present embodiment as well, the controller 300 controls the luminance through the decorative member 200 of the black display (the $0^{th}$ gradation) of the first liquid crystal display panel 110 to the luminance of the non-display region 220 of the decorative member 200, and controls the luminance through the decorative member 200 of the $1^{st}$ gradation and later of the first liquid crystal display panel 110 to the minimum luminance Lmin visible to the user or greater. Accordingly, as with the display device 10 of Embodiment 1, the display device 10 of the present embodiment can make the boundary BL between the display region 210 and the non-display region 220 less visible without reducing the visibility of the display. Additionally, the controller 300 controls, in accordance with the display of the first liquid crystal display panel 110, the luminance of the back light 120 by region 114a of the displayable region 114 and, as such, the display device 10 of the present embodiment can realize high-contrast displaying.

Embodiment 3

In Embodiment 1, the liquid crystal display 100 includes the first liquid crystal display panel 110 and the back light 120. A configuration is possible in which the liquid crystal display 100 further includes a second liquid crystal display panel 130 that displays monochrome images. In the present embodiment, the liquid crystal display 100 displays images through the decorative member 200 using the first liquid crystal display panel 110 and the second liquid crystal display panel 130.

As with the display device 10 of Embodiment 1, the display device 10 of the present embodiment includes a liquid crystal display 100, a decorative member 200, and a controller 300. The configuration of the decorative member 200 of the present embodiment is the same as the decorative member 200 of Embodiment 1 and, as such, here, the liquid crystal display 100 and the controller 300 of the present embodiment are described.

Figure 8:
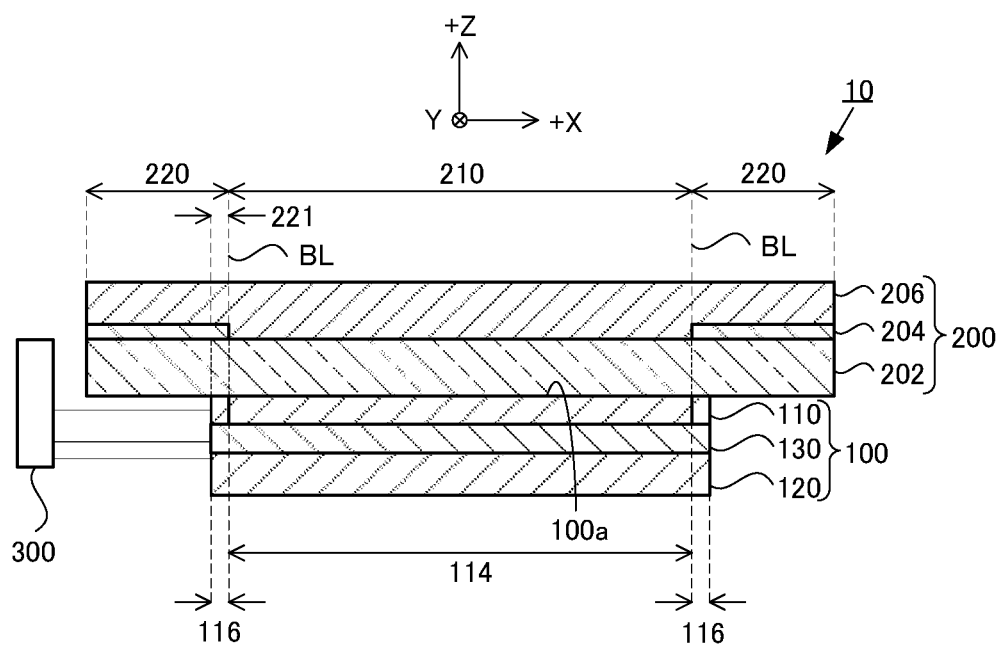
FIG. 8 is a cross-sectional view illustrating a display device according to Embodiment 3.

As illustrated in FIG. 8, the liquid crystal display 100 of the present embodiment includes a first liquid crystal display panel 110, a second liquid crystal display panel 130, and a back light 120. The configuration of the first liquid crystal display panel 110 of the present embodiment is the same as that of the first liquid crystal display panel 110 of Embodiment 1 and, as such, the second liquid crystal display panel 130 and the back light 120 are described.

The second liquid crystal display panel 130 displays monochrome images. In one example, the second liquid crystal display panel 130 is a horizontal electric field type monochrome liquid crystal display panel that is active matrix driven by TFTs. The second liquid crystal display panel 130 is disposed between the first liquid crystal display panel 110 and the back light 120.

Figure 9:
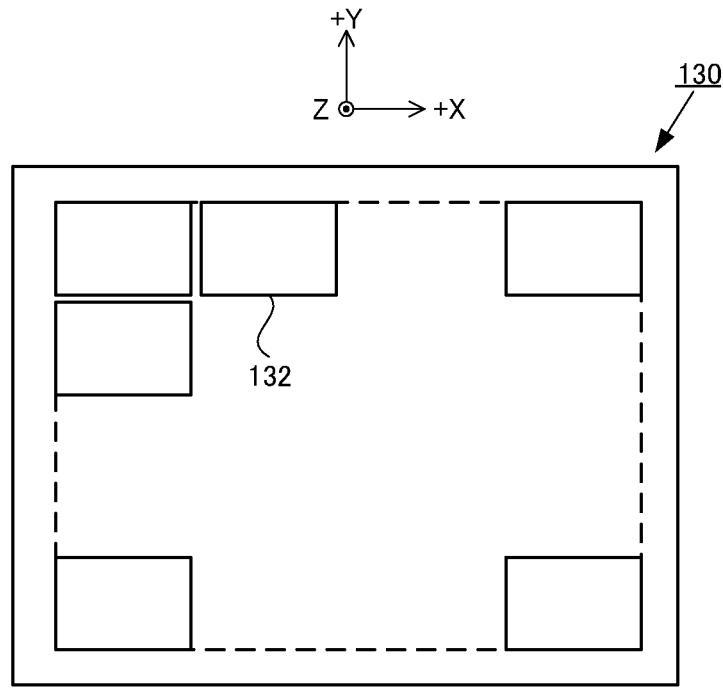
FIG. 9 is a plan view illustrating a second liquid crystal display panel according to Embodiment 3.

As illustrated in FIG. 9, the second liquid crystal display panel 130 includes main pixels 132 arranged in a matrix. The main pixels 132 of the second liquid crystal display panel 130 correspond to at least one main pixel 112 of the first liquid crystal display panel 110. The main pixels of the liquid crystal display 100 are formed from the main pixels 112 of the first liquid crystal display panel 110 and the main pixels 132 of the second liquid crystal display panel 130.

The back light 120 of the present embodiment emits light of a uniform luminance toward the first liquid crystal display panel 110 and the second liquid crystal display panel 130. The other configurations of the back light 120 of the present embodiment are the same as those of the back light 120 of Embodiment 1.

The controller 300 of the present embodiment controls the display of the first liquid crystal display panel 110 and the second liquid crystal display panel 130 and the luminance of the back light 120 to control the luminance through the decorative member 200 of a $1^{st}$ gradation of the liquid crystal display 100 to a minimum luminance Lmin visible to the user. Additionally, the controller 300 controls the luminance through the decorative member 200 of a black display ($0^{th}$ gradation) of the liquid crystal display 100 to a luminance of a non-display region 220 of the decorative member 200. In the present embodiment, the controller 300 controls the display of the second liquid crystal display panel 130 to control the luminance through the decorative member 200 of the black display of the liquid crystal display 100.

Figure 10:
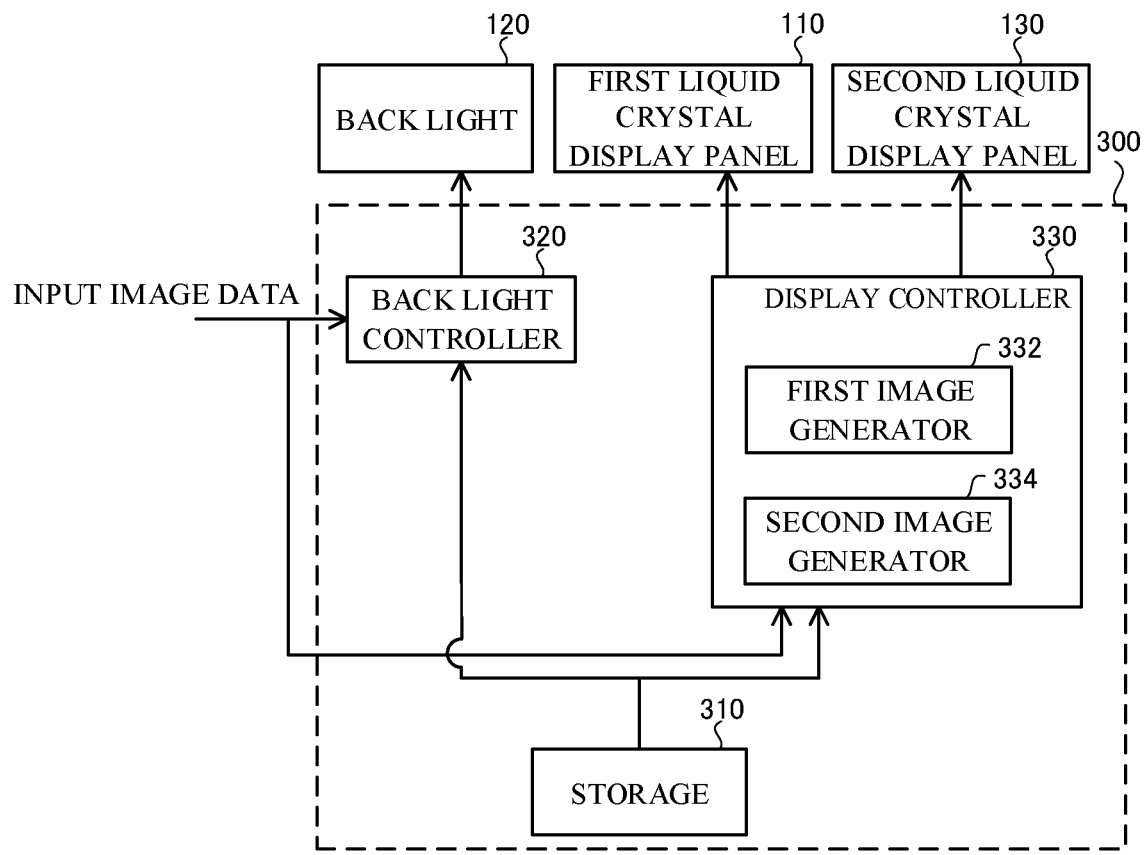
FIG. 10 is a block diagram illustrating the configuration of a controller according to Embodiment 3.

As illustrated in FIG. 10, the controller 300 of the present embodiment includes a storage 310, a back light controller 320, and a display controller 330.

The storage 310 of the present embodiment stores first gradation-luminance data, and second gradation-luminance data expressing the relationship between the gradation and the luminance of the second liquid crystal display panel 130. The second gradation-luminance data is measured in advance. Additionally, the storage 310 of the present embodiment stores the minimum luminance Lmin visible to the user and the luminance of the non-display region 220 of the decorative member 200. Furthermore, the storage 310 of the present embodiment stores programs, data, and the like that cause the back light controller 320 and the display controller 330 to function.

The back light controller 320 of the present embodiment controls the luminance of the back light 120 to a luminance corresponding to the displays of the first liquid crystal display panel 110 and the second liquid crystal display panel 130. This control is performed on the basis of the first gradation-luminance data, the second gradation-luminance data, and the luminance of the non-display region 220 of the decorative member 200.

As illustrated in FIG. 10, the display controller 330 of the present embodiment includes a first image generator 332 and a second image generator 334. The first image generator 332 generates first display image data to be displayed on the first liquid crystal display panel 110. The second image generator 334 generates second display image data to be displayed on the second liquid crystal display panel 130.

The first image generator 332 generates, from input image data, the first display image data expressing an image to be displayed on the first liquid crystal display panel 110. This generation is performed on the basis of the first gradation-luminance data and the minimum luminance Lmin visible to the user. As with the display controller 330 of Embodiment 1, the first image generator 332 increases the luminance value of the $1^{st}$ gradation in the first gradation-luminance data to the minimum luminance Lmin visible to the user, and increases the luminance value of each of the $2^{nd}$ gradation and later in the first gradation-luminance data an increased amount ΔL1 of the luminance of the $1^{st}$ gradation to generate the first display image data from the input image data.

The first image generator 332 sends a first display image signal expressing the generated first display image data to a driver circuit (not illustrated in the drawings) of the first liquid crystal display panel 110 and to the second image generator 334. The first liquid crystal display panel 110 displays characters, images, or the like on the basis of the sent first display image signal.

Firstly, the second image generator 334 generates, on the basis of the first display image data and the second gradation-luminance data, luminance data for generating a monochrome image from the input image data. For example, when one main pixel 132 of the second liquid crystal display panel 130 corresponds to one main pixel 112 of the first liquid crystal display panel 110, the second image generator 334 calculates the luminance of the corresponding one main pixel 132 of the second liquid crystal display panel 130 on the basis of the first display image data of the one main pixel 112 of the first liquid crystal display panel 110 to generate the luminance data. When one main pixel 132 of the second liquid crystal display panel 130 corresponds to a plurality of main pixels 112 of the first liquid crystal display panel 110, the second image generator 334 calculates the luminance of the main pixel 132 of the second liquid crystal display panel 130 from an average value, a frequency value, a minimum value, a maximum value, or the like of gradation values of the corresponding plurality of main pixels 112 to generate the luminance data.

Next, the second image generator 334 generates the second display image data expressing an image to be displayed on the second liquid crystal display panel 130. This generation is performed on the basis of the generated luminance data, and the luminance of the non-display region 220 of the decorative member 200. In the present embodiment, the second image generator 334 adjusts the luminance of the main pixel 132, among the main pixels 132 of the second liquid crystal display panel 130, that corresponds to the main pixel 112, of the first liquid crystal display panel 110, that displays black to a luminance at which the luminance through the decorative member 200 of the black display of the first liquid crystal display panel 110 and the luminance of the non-display region 220 of the decorative member 200 are equal to generate the second display image data.

The second image generator 334 sends a second display image signal expressing the generated second display image data to a driver circuit (not illustrated in the drawings) of the second liquid crystal display panel 130. The second liquid crystal display panel 130 displays an image on the basis of the sent second display image signal.

In the present embodiment as well, the controller 300 controls the luminance through the decorative member 200 of the black display (the $0^{th}$ gradation) of the first liquid crystal display panel 110 to the luminance of the non-display region 220 of the decorative member 200, and controls the luminance through the decorative member 200 of the $1^{st}$ gradation and later of the first liquid crystal display panel 110 to the minimum luminance Lmin visible to the user or greater. Accordingly, as with the display device 10 of Embodiment 1, the display device 10 of the present embodiment can make the boundary BL between the display region 210 and the non-display region 220 less visible without reducing the visibility of the display. Additionally, as with the display device 10 of Embodiment 2, the display device 10 of the present embodiment can realize high-contrast displaying.

Embodiment 4

A configuration is possible in which the display device 10 includes a detector 500 that detects external light. A configuration is possible in which the display device 10 controls, in accordance with the brightness of the external light detected by the detector 500, the luminance through the decorative member 200 of a $1^{st}$ gradation of a liquid crystal display 100 to a minimum luminance Lmin visible to the user.

Figure 11:
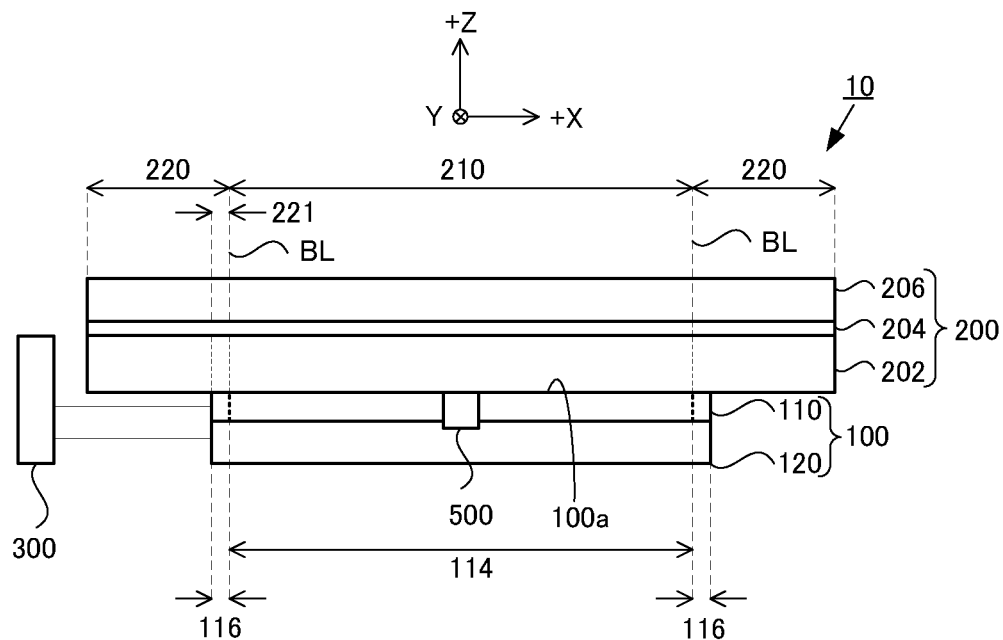
FIG. 11 is a side view illustrating a display device according to Embodiment 4.
Figure 12:
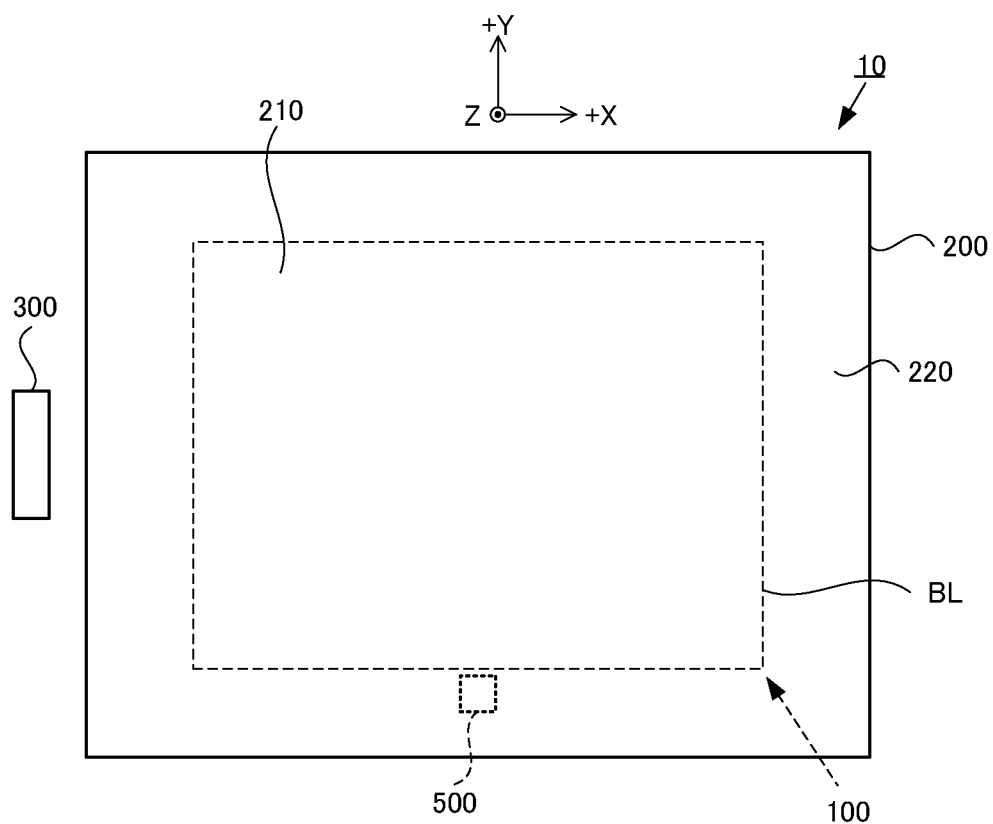
FIG. 12 is a plane view illustrating the display device according to Embodiment 4.

As with the display device 10 of Embodiment 1, the display device 10 of the present embodiment includes a liquid crystal display 100, a decorative member 200, and a controller 300. Additionally, as illustrated in FIGS. 11 and 12, the display device 10 of the present embodiment further includes a detector 500. The liquid crystal display 100 and the decorative member 200 of the present embodiment are the same as in Embodiment 1 and, as such, the detector 500 and the controller 300 of the present embodiment are described.

The detector 500 detects external light. Here, the term "external light" refers to light that is incident on the decorative member 200 from around the display device 10. In one example, the detector 500 is implemented as an illuminance sensor, and detects the brightness of the external light. The detector 500 sends, to the controller 300, an external light signal expressing the detected brightness of the external light.

Figure 13:
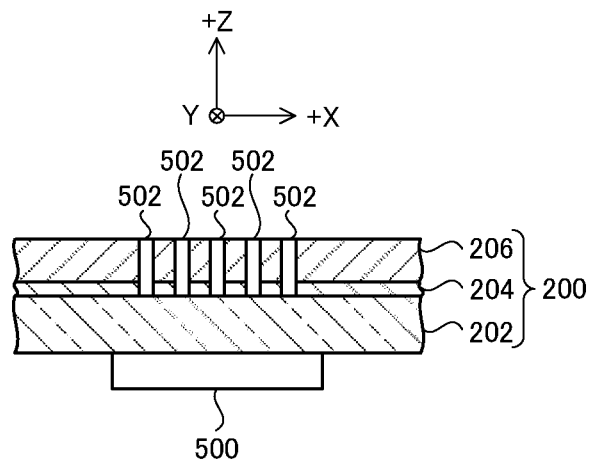
FIG. 13 is a cross-sectional view illustrating a decorative member and a detector according to Embodiment 4.

In one example, as illustrated in FIG. 11, the detector 500 is provided on the −Z side surface of a light-transmitting cover 202 of the decorative member 200. Additionally, as illustrated in FIG. 12, when viewing the display device 10 planarly from the +Z direction, the detector 500 is disposed at a position, of a non-display region 220 of the decorative member 200, near a display region 210. Note that, as illustrated in FIG. 13, light-transmitters 502 that transmit the external light are provided at portions, in a light blocking layer 204 and a decoration layer 206, positioned on the +Z side (directly above) the detector 500.

Figure 14:
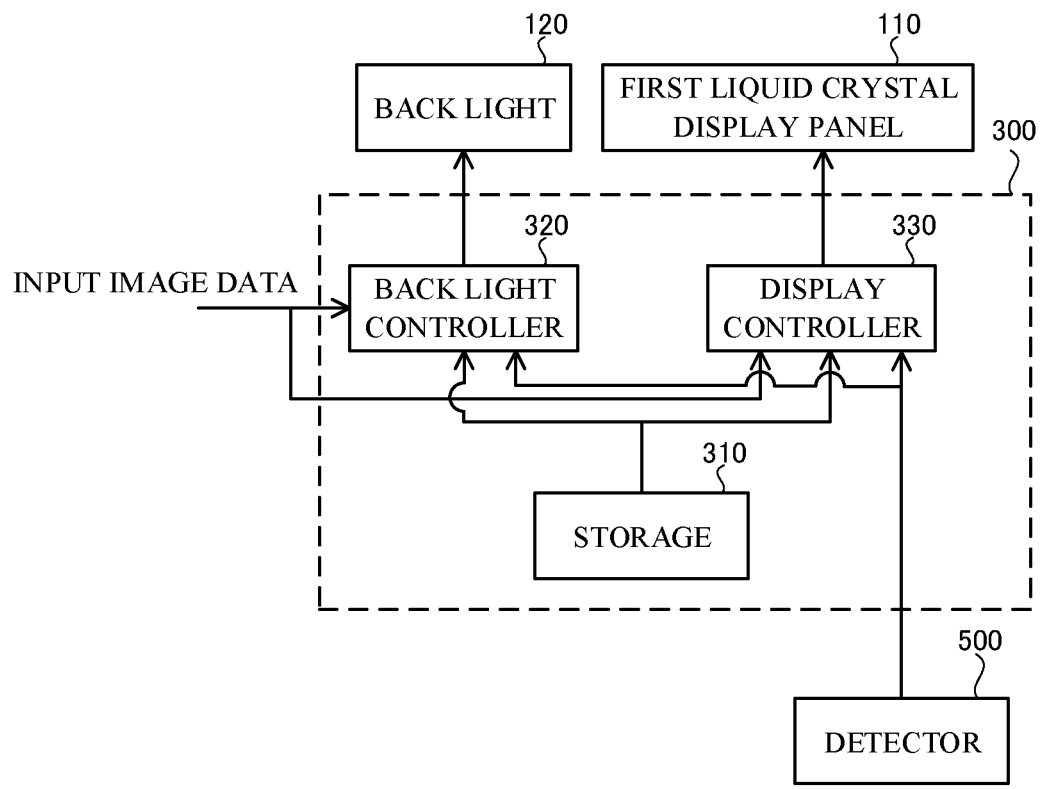
FIG. 14 is a block diagram illustrating the configuration of a controller according to Embodiment 4.

The controller 300 of the present embodiment controls, in accordance with the brightness of the external light detected by the detector 500, the luminance through the decorative member 200 of the $1^{st}$ gradation of the liquid crystal display 100 to the minimum luminance Lmin visible to the user. As illustrated in FIG. 14, the controller 300 of the present embodiment includes a storage 310, a back light controller 320, and a display controller 330.

Figure 15:
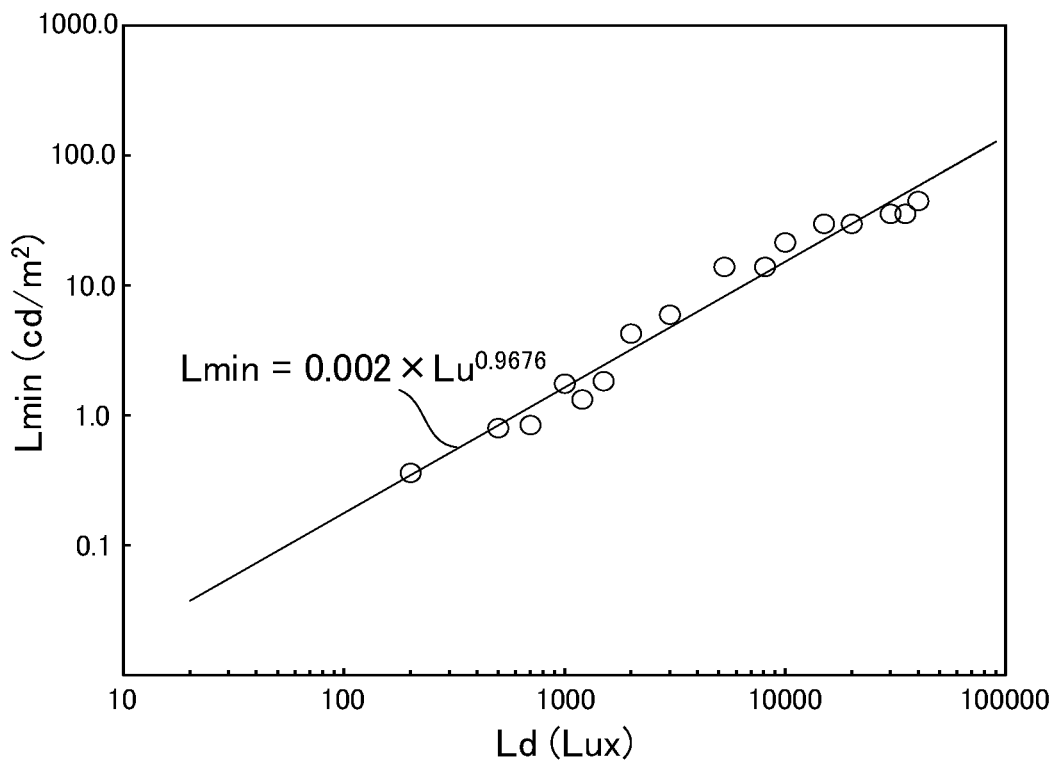
FIG. 15 is a drawing for explaining minimum luminance data according to Embodiment 4.

The storage 310 of the present embodiment stores first gradation-luminance data, and minimum luminance data expressing the relationship between the brightness of the external light and the minimum luminance Lmin visible to the user. The minimum luminance data can be obtained by changing an illuminance Ld of the external light and the luminance of the display (for example, a checker pattern) of the first liquid crystal display panel 110 and measuring whether the user can see the display through the decorative member 200 at each luminance. For example, with the decorative member 200 for which the transmittance is 20%, as illustrated in FIG. 15, the relationship Lmin=0.002× $Ld^{0.9676}$ (determination coefficient: 0.9695) is obtained.

The back light controller 320 of the present embodiment controls the luminance of a back light 120 on the basis of the first gradation-luminance data, the minimum luminance data, and the detected brightness of the external light (the illuminance Ld of the external light). The back light controller 320 of the present embodiment controls the luminance of the back light 120 to a luminance at which the luminance through the decorative member 200 of the black display of the first liquid crystal display panel 110 is a luminance Lu invisible to the user. In one example, the luminance Lu invisible to the user can be set to a luminance that is calculated from the detected brightness of the external light (the illuminance Ld of the external light) and the minimum luminance data, the luminance being to a slightly lower than the minimum luminance Lmin visible to the user (for example, 0.01 cd/m$^2$ to 0.5 cd/m$^2$).

The display controller 330 of the present embodiment generates, from input image data, first display image data to be displayed on the first liquid crystal display panel 110. This generation is performed on the basis of the first gradation-luminance data, the minimum luminance data, and the detected brightness of the external light (the illuminance Ld of the external light). Specifically, the display controller 330 of the present embodiment firstly calculates the minimum luminance Lmin visible to the user from the detected brightness of the external light (the illuminance Ld of the external light) and the minimum luminance data (for example, when Ld=50 lx, Lmin=0.09 cd/m$^2$, and when Ld=50 klx, Lmin=70 cd/m$^2$). Next, the display controller 330 of the present embodiment increases the luminance value of the $1^{st}$ gradation in the first gradation-luminance data to the calculated minimum luminance Lmin visible to the user, and increases the luminance value of each of the $2^{nd}$ gradation and later in the first gradation-luminance data an increased amount ΔL1 of the luminance of the $1^{st}$ gradation to generate the first display image data.

Figure 16:
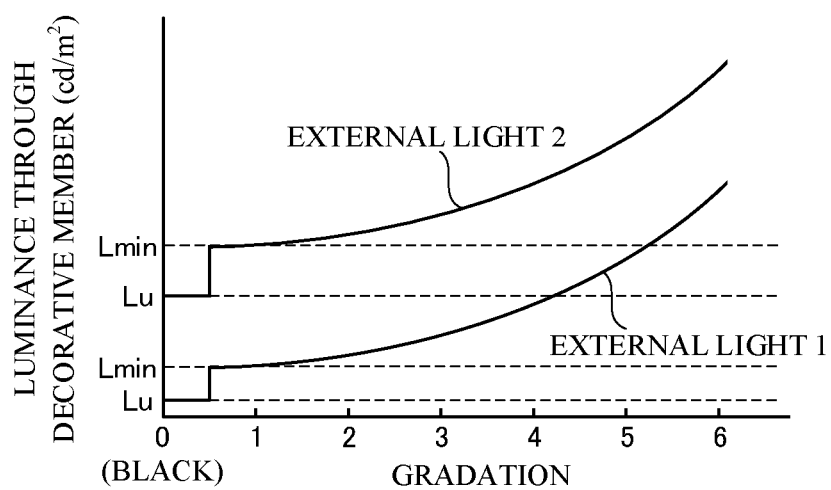
FIG. 16 is a drawing illustrating luminance through the decorative member according to Embodiment 4.

As illustrated in FIG. 16, in accordance with the brightness of the external light (brightness of external light 2>brightness of external light 1), the controller 300 of the present embodiment controls the luminance through the decorative member 200 of the black display (the $0^{th}$ gradation) of the first liquid crystal display panel 110 to the luminance Lu invisible to the user, and controls the luminance through the decorative member 200 of the $1^{st}$ gradation and later of the first liquid crystal display panel 110 to the minimum luminance Lmin visible to the user or greater. Due to these configurations, the black display (the $0^{th}$ gradation) of the first liquid crystal display panel 110 is not visible to the user, and the displays of the $1^{st}$ gradation and later of the first liquid crystal display panel 110 are visible to the user. Accordingly, the display device 10 of the present embodiment can make the boundary BL between the display region 210 and the non-display region 220 less visible without reducing the visibility of the display, regardless of the use environment. Note that FIG. 16 illustrates the relationship between portions of the gradation and the luminance.

Embodiment 5

A configuration is possible in which the display device 10 controls the luminance of a first liquid crystal display panel 110 in accordance with a color of a decorative member 200. As with the display device 10 of Embodiment 1, the display device 10 of the present embodiment includes a liquid crystal display 100, a decorative member 200, and a controller 300. The configuration of the decorative member 200 of the present embodiment is the same as the decorative member 200 of Embodiment 1 and, as such, here, the liquid crystal display 100 and the controller 300 of the present embodiment are described.

As with the liquid crystal display 100 of Embodiment 1, the liquid crystal display 100 of the present embodiment is a transmissive liquid crystal display device that displays characters or images, and is adhered to the decorative member 200. As with the liquid crystal display 100 of Embodiment 1, the liquid crystal display 100 includes a first liquid crystal display panel 110 and a back light 120. The configuration of the back light 120 of the present embodiment is the same as the back light 120 of Embodiment 1 and, as such, the first liquid crystal display panel 110 of the present embodiment is described.

Figure 17:
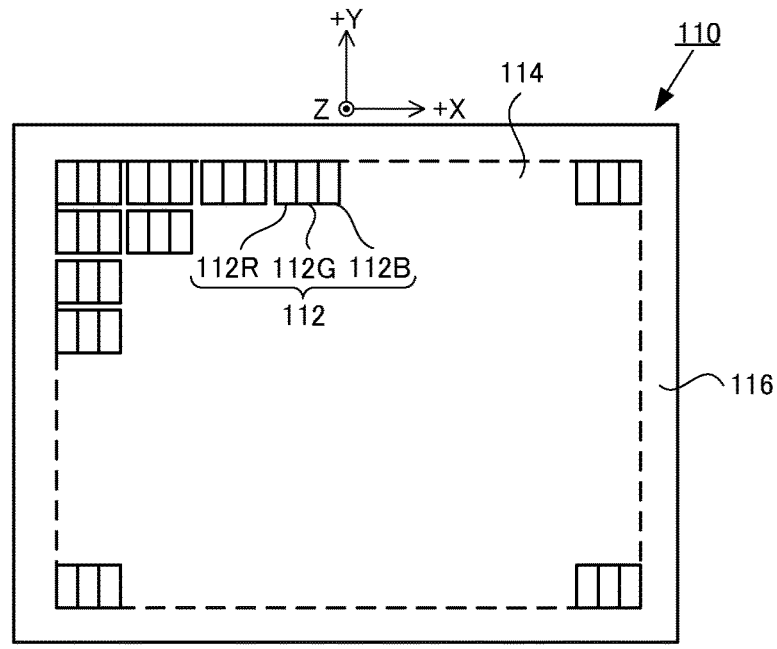
FIG. 17 is a plan view illustrating a first liquid crystal display panel according to Embodiment 5.

In one example, the first liquid crystal display panel 110 of the present embodiment is a horizontal electric field type color liquid crystal display panel that is active matrix driven by TFTs. As with the first liquid crystal display panel 110 of Embodiment 1, the first liquid crystal display panel 110 includes a displayable region 114 in which main pixels 112 are arranged in a matrix, and a frame region 116 in which wiring, a drive circuit, and the like are disposed. The frame region 116 surrounds the displayable region 114. As illustrated in FIG. 17, the main pixels 112 of the present embodiment include a red pixel 112R that emits red light, a green pixel 112G that emits green light, and a blue pixel 112B that emits blue light. In the following, the red pixel 112R, the green pixel 112G, and the blue pixel 112B, are sometimes referred to collectively as "sub pixels."

As with the controller 300 of Embodiment 1, the controller 300 of the present embodiment includes a storage 310, a back light controller 320, and a display controller 330. In the following, the chromaticity coordinates of the color are described as (x. y), and the luminances of the red pixel 112R, the green pixel 112G, and the blue pixel 112B (the sub pixels) are described as (Rxy, Gxy, Bxy), The storage 310 of the present embodiment stores color change data expressing a change of the color, due to the decorative member 200, of the emitted light of the first liquid crystal display panel 110. The color change data is measured in advance in accordance with the use environment of the display device 10. A detailed description of the color change data is given later.

Additionally, the storage 310 of the present embodiment stores gradation-luminance data of the first liquid crystal display panel 110 (that is, gradation-luminance data by sub pixel), the minimum luminance Lmin visible to the user, and the luminance of a non-display region 220 of the decorative member 200. Furthermore, the storage 310 of the present embodiment stores programs, data, and the like that cause the back light controller 320 and the display controller 330 to function.

The back light controller 320 of the present embodiment controls the luminance of the back light 120 on the basis of the gradation-luminance data by sub pixel, and the luminance of the non-display region 220 of the decorative member 200. As with the back light controller 320 of Embodiment 1, the back light controller 320 of the present embodiment controls the luminance of the back light 120 to a luminance at which the luminance through the decorative member 200 of the black display of the first liquid crystal display panel 110 and the luminance of the non-display region 220 of the decorative member 200 are equal.

Figure 18:
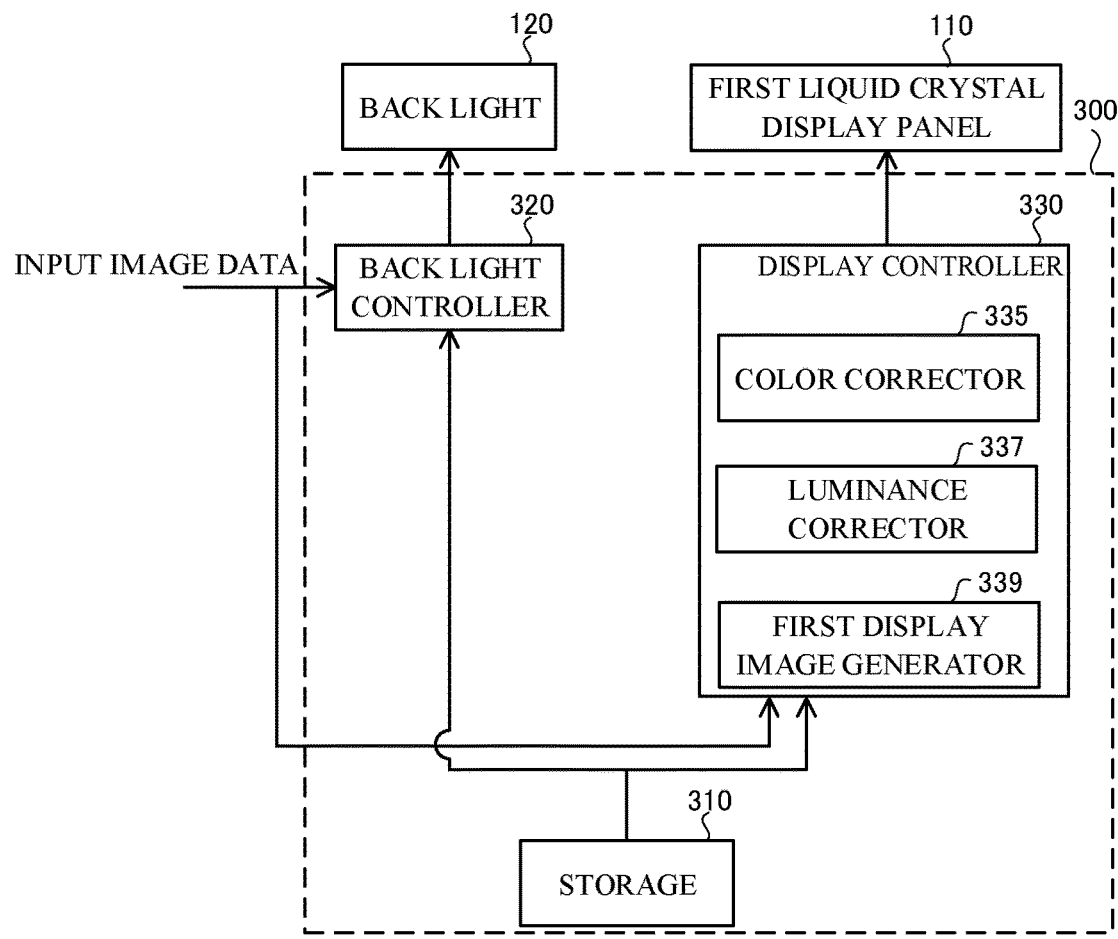
FIG. 18 is a block diagram illustrating the configuration of a controller according to Embodiment 5.

The display controller 330 of the present embodiment controls the luminances of the sub pixels (the red pixel 112R, the green pixel 112G, and the blue pixel 112B) of the first liquid crystal display panel 110 in accordance with the color of the decorative member 200. As illustrated in FIG. 18, the display controller 330 of the present embodiment includes a color corrector 335, a luminance corrector 337, and a first display image generator 339.

Figure 19:
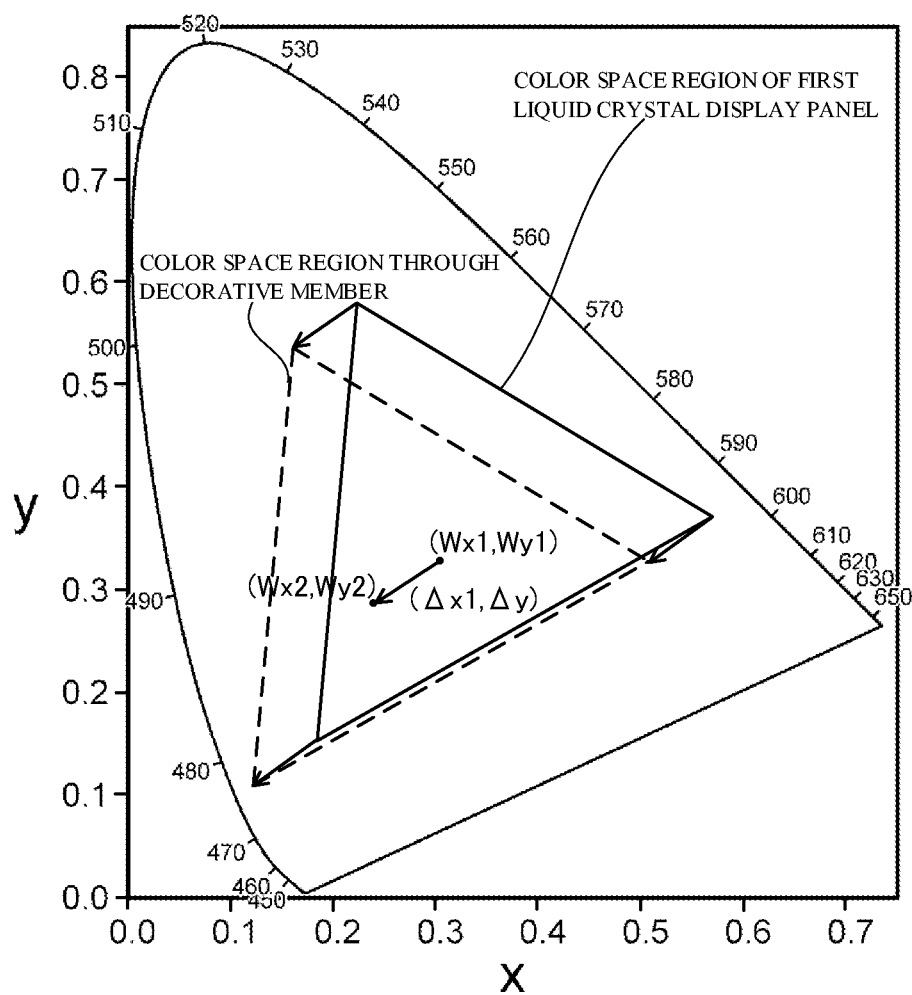
FIG. 19 is a chromaticity diagram for explaining color change data according to Embodiment 5.

Firstly, the color change data is described. When the chromaticity coordinates of the color through the decorative member 200 are (Wx2, Wy2) in a case in which the first liquid crystal display panel 110 displays white (Wx1, Wy1), a change (Δx, Δy) of the color, due to the decorative member 200, of the emitted light of the first liquid crystal display panel 110 is, as illustrated in FIG. 19, expressed as (Δx, Δy)=(Wx1−Wx2, Wy1−Wy2). In the present embodiment, the storage 310 stores, as the color change data, luminances (ΔRxy, ΔGxy, ΔBxy) of the sub pixels that correspond to the (Δx, Δy) obtained by measurement.

The color corrector 335 adjusts the color that the first liquid crystal display panel 110 displays to a color whereby the input image can be reproduced through the decorative member 200. The color corrector 335 converts, on the basis of the color change data and the gradation-luminance data by sub pixel, the gradation-luminance data stored in the storage 310 by sub pixel to gradation-luminance data (hereinafter referred to as "first color correction data") whereby the input image can be reproduced through the decorative member 200.

Specifically, the color corrector 335 subtracts ΔRxy of the color change data from each of the luminance values of the gradation-luminance data of the red pixel 112R to generate the first color correction data of the red pixel 112R from the gradation-luminance data of the red pixel 112R. The color corrector 335 subtracts ΔGxy of the color change data from each of the luminance values of the gradation-luminance data of the green pixel 112G to generate the first color correction data of the green pixel 112G from the gradation-luminance data of the green pixel 112G. In the same manner as for the red pixel 112R and the green pixel 112G, for the blue pixel 112B as well, the color corrector 335 generates the first color correction data of the blue pixel 112B from the gradation-luminance data of the blue pixel 112B. As a result, the display controller 330 can adjust the color that the first liquid crystal display panel 110 displays to a color whereby the input image can be reproduced through the decorative member 200.

The luminance corrector 337 controls the luminance of the $1^{st}$ gradation to the minimum luminance Lmin visible to the user. The luminance corrector 337 adjusts the luminance value of each of the sub pixels on the basis of the minimum luminance Lmin visible to the user and the first color correction data by sub pixel to generate gradation-luminance data in which the color and the luminance are adjusted by sub pixel (hereinafter referred to as "first correction luminance data").

Figure 20:
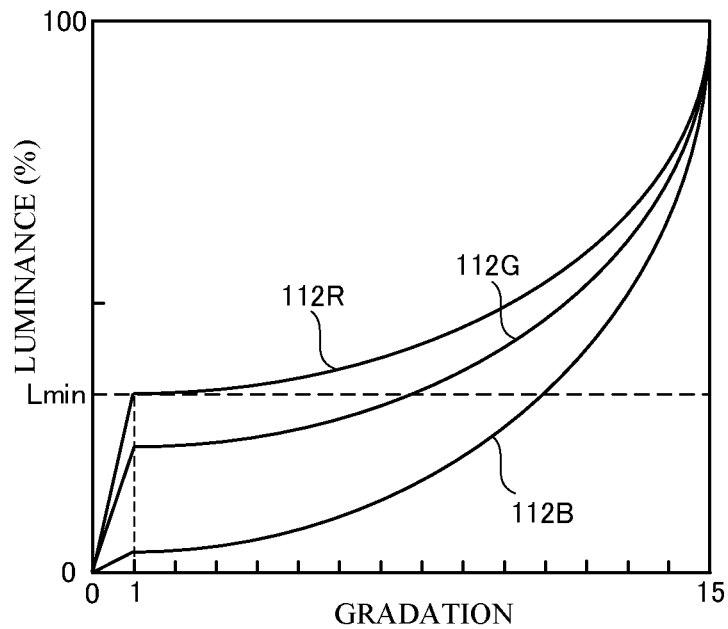
FIG. 20 is a drawing illustrating an example of first correction luminance data according to Embodiment 5.

Specifically, the luminance corrector 337 sets the greatest luminance value among the luminance values of the $1^{st}$ gradation of the first color correction data by sub pixel to the minimum luminance Lmin visible to the user. Additionally, the luminance corrector 337 adjusts the other luminance values in accordance with the increased amount for increasing the greatest luminance value to the minimum luminance Lmin visible to the user. As a result, the luminance corrector 337 generates, by sub pixel, the first correction luminance data such as illustrated in FIG. 20. FIG. 20 illustrates an example of the first correction luminance data in a case in which the luminance value of the $1^{st}$ gradation of the red pixel 112R is the greatest luminance value. Additionally, FIG. 20 illustrates the luminance obtained by setting the maximum value of the luminance values of the sub pixels (for example, the luminance of the sub pixels when the first liquid crystal display panel 110 displays white) to 100%. As a result, the display controller 330 can control the luminance of the $1^{st}$ gradation to the minimum luminance Lmin visible to the user.

The first display image generator 339 generates, from the input image data, color image data to be displayed on the first liquid crystal display panel 110. This generation is performed on the basis of the first correction luminance data by sub pixel. Additionally, the first display image generator 339 sends a first display image signal expressing the generated color image data to a driver circuit (not illustrated in the drawings) of the first liquid crystal display panel 110. The first liquid crystal display panel 110 displays characters, images, or the like on the basis of the sent first display image signal.

As described above, the controller 300 of the present embodiment controls the luminance by sub pixel in accordance with the color of the decorative member 200 and, as such, the display device 10 of the present embodiment can reproduce an input image through the decorative member 200. Additionally, as in Embodiment 1, the luminance through the decorative member 200 of the black display (the $0^{th}$ gradation) of the first liquid crystal display panel 110 is controlled to the luminance of the non-display region 220 of the decorative member 200, and the luminance through the decorative member 200 of the $1^{st}$ gradation and later of the first liquid crystal display panel 110 is controlled to the minimum luminance Lmin visible to the user or greater. Accordingly, the display device 10 of the present embodiment can make the boundary BL between the display region 210 and the non-display region 220 less visible without reducing the visibility of the display.

Embodiment 6

In Embodiment 5, the controller 300 (the color corrector 335) subtracts the luminance of the color change data expressing the change of the color from the luminance value of the gradation-luminance data by sub pixel to adjust the color that the first liquid crystal display panel 110 displays to a color whereby the input image can be reproduced through the decorative member 200. However, the controller 300 may use another method to adjust the color that the first liquid crystal display panel 110 displays to a color whereby the input image can be reproduced through the decorative member 200.

In the display device 10 of the present embodiment, a controller 300 differs from the controller 300 of Embodiment 5. The other configurations of the display device 10 of the present embodiment are the same as the display device 10 of Embodiment 5.

As with the controller 300 of Embodiment 5, the controller 300 of the present embodiment includes a storage 310, a back light controller 320, and a display controller 330.

The storage 310 of the present embodiment stores first luminance ratio data for adjusting a change of the color, due to a decorative member 200, of emitted light of a first liquid crystal display panel 110. The first luminance ratio data is measured in advance in accordance with the use environment of the display device 10. A detailed description of the first luminance ratio data is given later. Additionally, the storage 310 of the present embodiment stores gradation-luminance data of the first liquid crystal display panel 110 (that is, gradation-luminance data by sub pixel), a minimum luminance Lmin visible to the user, a luminance of a non-display region 220 of the decorative member 200, programs, and the like.

As with the back light controller 320 of Embodiment 5, a back light controller 320 of the present embodiment controls a luminance of a back light 120 to a luminance at which a luminance through the decorative member 200 of the black display of the first liquid crystal display panel 110 and the luminance of the non-display region 220 of the decorative member 200 are equal. This control is performed on the basis of the gradation-luminance data by sub pixel and the luminance of the non-display region 220 of the decorative member 200.

The display controller 330 of the present embodiment controls luminances of the sub pixels of the first liquid crystal display panel 110 in accordance with the color of the decorative member 200. As with the display controller 330 of Embodiment 5, the display controller 330 of the present embodiment includes a color corrector 335, a luminance corrector 337, and a first display image generator 339.

Firstly, the first luminance ratio data is described. As in Embodiment 5, chromaticity coordinates for a case in which the first liquid crystal display panel 110 displays white are set as (Wx1, Wy1). In the present embodiment, a luminance ratio of the sub pixels at which the chromaticity coordinates of the color through the decorative member 200 are (Wx1, Wy1) is defined as the first luminance ratio data. In one example, the first luminance ratio data is measured in advance, with the luminance of the sub pixel that has the greatest luminance value (for example, the green pixel 112G) set to 100%.

The color corrector 335 of the present embodiment converts, on the basis of the first luminance ratio data and the gradation-luminance data by sub pixel, the gradation-luminance data stored in the storage 310 by sub pixel to gradation-luminance data (hereinafter referred to as "second color correction data") whereby the input image can be reproduced through the decorative member 200.

Specifically, when the sub pixel having the greatest luminance value is the green pixel 112G, the color corrector 335 sets the gradation-luminance data of the green pixel 112G of the first liquid crystal display panel 110 as the second color correction data of the green pixel 112G. Meanwhile, the color corrector 335 multiplies each luminance value of the gradation-luminance data of the green pixel 112G of the first liquid crystal display panel 110 by the luminance ratio (for example, R1%) of the red pixel 112R in the first luminance ratio data to generate the second color correction data of the red pixel 112R. Additionally, the color corrector 335 multiplies each luminance value of the gradation-luminance data of the green pixel 112G of the first liquid crystal display panel 110 by the luminance ratio (for example B1%) of the blue pixel 112B in the first luminance ratio data to generate the second color correction data of the blue pixel 112B. As a result, the display controller 330 can adjust the color that the first liquid crystal display panel 110 displays to a color whereby the input image can be reproduced through the decorative member 200.

The luminance corrector 337 of the present embodiment controls the luminance of a $1^{st}$ gradation to a luminance visible to the user (a luminance greater than or equal to the minimum luminance Lmin). The luminance corrector 337 of the present embodiment adjusts the luminance value of each of the sub pixels on the basis of the minimum luminance Lmin visible to the user and the second color correction data by sub pixel to generate gradation-luminance data in which the color and the luminance are adjusted by sub pixel (hereinafter referred to as "second correction luminance data").

Figure 21:
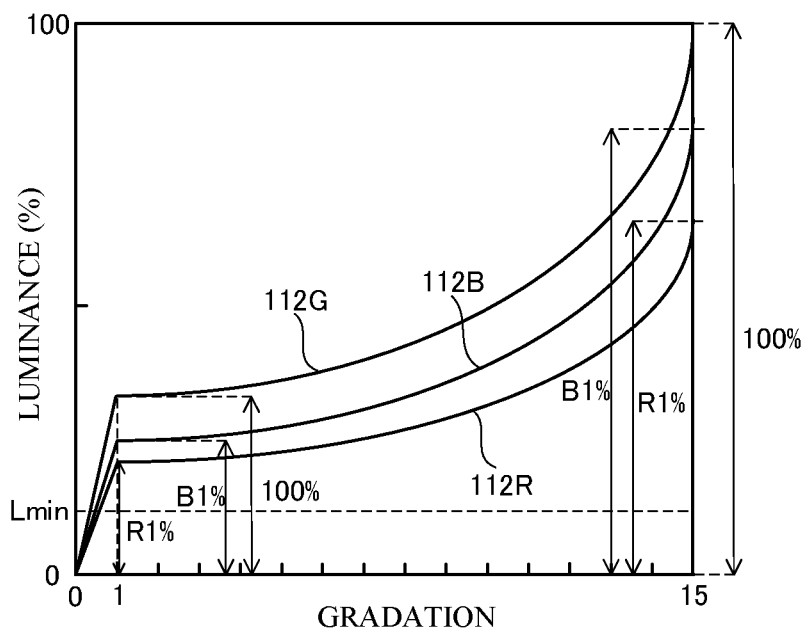
FIG. 21 is a drawing illustrating an example of second correction luminance data according to Embodiment 6.

Specifically, the luminance corrector 337 of the present embodiment sets the greatest luminance value (for example the luminance value of the $1^{st}$ gradation of the green pixel 112G) among the luminance values of the $1^{st}$ gradation of the second color correction data by sub pixel to the minimum luminance Lmin visible to the user or greater. Additionally, the luminance corrector 337 of the present embodiment adjusts the other luminance values in accordance with the increased amount for increasing the greatest luminance value to the minimum luminance Lmin visible to the user or greater. As a result, the luminance corrector 337 of the present embodiment generates, by sub pixel, the second correction luminance data such as illustrated in FIG. 21. FIG. 21 illustrates an example of the second correction luminance data in a case in which the luminance value of the green pixel 112G is the greatest luminance value. Additionally, FIG. 21 illustrates the luminance obtained by setting the maximum value of the luminance values of the sub pixels (for example, the luminance value of the sub pixels when the first liquid crystal display panel 110 displays white) to 100%. As a result, the display controller 330 can control the luminance of the $1^{st}$ gradation to the minimum luminance Lmin visible to the user or greater.

The first display image generator 339 of the present embodiment generates, from the input image data, color image data to be displayed on the first liquid crystal display panel 110. This generation is performed on the basis of the second correction luminance data by sub pixel. Additionally, the first display image generator 339 of the present embodiment sends a first display image signal expressing the generated color image data to the driver circuit of the first liquid crystal display panel 110. The first liquid crystal display panel 110 displays characters, images, or the like on the basis of the sent first display image signal.

As described above, the controller 300 of the present embodiment controls the luminance by sub pixel in accordance with the color of the decorative member 200 and, as such, the display device 10 of the present embodiment can reproduce the input image through the decorative member 200. Additionally, the luminance through the decorative member 200 of the black display (the $0^{th}$ gradation) of the first liquid crystal display panel 110 is controlled to the luminance of the non-display region 220 of the decorative member 200, and the luminance through the decorative member 200 of the $1^{st}$ gradation and later of the first liquid crystal display panel 110 is controlled to the minimum luminance Lmin visible to the user or greater. Accordingly, the display device 10 of the present embodiment can make the boundary BL between the display region 210 and the non-display region 220 less visible without reducing the visibility of the display.

Embodiment 7

In Embodiment 6, the sub pixels other than the sub pixel that has the greatest luminance value are adjusted so as to reduce the luminance at the same ratio in all gradations. However, a configuration is possible in which the controller 300 adjusts the luminances of the sub pixels using a luminance ratio at which the input image can be reproduced through the decorative member 200 at any gradation except for the maximum gradation, and so as to have the greatest luminance value (for example, the luminance value when the first liquid crystal display panel 110 displays white) in the maximum gradation.

In the present embodiment, a sub pixel luminance ratio at which chromaticity coordinates of a color, through a decorative member 200 of a $1^{st}$ gradation (any gradation) among gradations from black to white, match the chromaticity of a color whereby a first liquid crystal display panel 110 displays the $1^{st}$ gradation among the gradations from black to white, is defined as second luminance ratio data. In the present embodiment as well, in one example, the second luminance ratio data is measured in advance, with the luminance of the sub pixel that has the greatest luminance value (for example, the green pixel 112G) set to 100%. Additionally, the second luminance ratio data is stored in a storage 310.

The color corrector 335 of the present embodiment converts the gradation-luminance data by sub pixel to the gradation-luminance data whereby the input image can be reproduced through the decorative member 200 in the $1^{st}$ gradation (hereinafter referred to as "third color correction data"). This conversion is performed on the basis of the second luminance ratio data and gradation-luminance data by sub pixel stored in the storage 310.

Specifically, when the sub pixel having the greatest luminance value is the green pixel 112G, the color corrector 335 sets the gradation-luminance data of the green pixel 112G of the first liquid crystal display panel 110 as the third color correction data of the green pixel 112G. The color corrector 335 multiplies the luminance value of the $1^{st}$ gradation of the gradation-luminance data of the green pixel 112G of the first liquid crystal display panel 110 by the luminance ratio (for example, R2%) of the red pixel 112R in the second luminance ratio data to generate the luminance value of the $1^{st}$ gradation in the third color correction data of the red pixel 112R. Additionally, the color corrector 335 generates the luminance values of the $2^{nd}$ gradation and later in the third color correction data of the red pixel 112R such that the luminance value of the maximum gradation is the greatest luminance value (the luminance value when the first liquid crystal display panel 110 displays white). Furthermore, the color corrector 335 multiplies the luminance value of the $1^{st}$ gradation of the gradation-luminance data of the green pixel 112G of the first liquid crystal display panel 110 by the luminance ratio (for example, B2%) of the blue pixel 112B in the second luminance ratio data to generate the luminance value of the $1^{st}$ gradation in the third color correction data of the blue pixel 112B. The color corrector 335 generates the luminance values of the $2^{nd}$ gradation and later in the third color correction data of the blue pixel 112B such that the luminance value at the maximum gradation is the greatest luminance value. As a result, the display controller 330 can adjust the color that the first liquid crystal display panel 110 displays near the $1^{st}$ gradation (any gradation except for the maximum gradation) to a color whereby the input image can be reproduced through the decorative member 200, and can realize a bright display at the maximum gradation.

Figure 22:
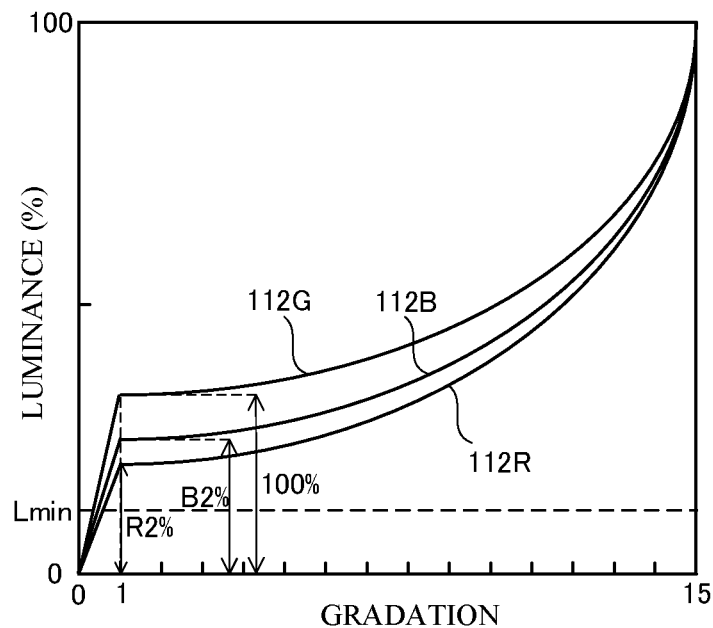
FIG. 22 is a drawing illustrating an example of third correction luminance data according to Embodiment 7.

As with the luminance corrector 337 of Embodiment 6, the luminance corrector 337 of the present embodiment adjusts the luminance values of each of the sub pixels on the basis of the minimum luminance Lmin visible to the user and the third color correction data by sub pixel to generate, by sub pixel, gradation-luminance data (hereinafter referred to as "third correction luminance data") in which the color and the luminance are adjusted, as illustrated in FIG. 22. FIG. 22 illustrates an example of the third correction luminance data in a case in which the luminance value of the green pixel 112G is the greatest luminance value. Additionally, FIG. 22 illustrates the luminance obtained by setting the maximum value of the luminance values of the sub pixels (for example, the luminance value of the sub pixels when the first liquid crystal display panel 110 displays white) to 100%. As a result, the display controller 330 can control the luminance of the $1^{st}$ gradation to the minimum luminance Lmin visible to the user or greater.

The configurations of the back light controller 320 and the first display image generator 339 of the present embodiment are the same as in Embodiment 6.

As described above, the display device 10 of the present embodiment can reproduce the input image through the decorative member 200 near any gradation except for the maximum gradation, and can realize a bright display at the maximum gradation. Additionally, as with the display device 10 of Embodiment 6, the display device 10 of the present embodiment can make the boundary BL between the display region 210 and the non-display region 220 less visible without reducing the visibility of the display.

Embodiment 8

A configuration is possible in which the controller 300 adjusts the chromaticity of black when black is displayed.

For example, in the display device 10 of Embodiment 5, in a state in which a liquid crystal display 100 is not displaying characters, images, or the like (OFF state), chromaticity coordinates of black (SBx, SBy) of a light blocking layer 204 of a decorative member 200 are brought close to chromaticity coordinates of black (BlxO, BlyO) in the OFF state of the liquid crystal display 100 in order to make a boundary BL between a display region 210 and a non-display region 220 less visible. In this case, as illustrated in FIG. 23, a chromaticity difference ($\Delta$x1, $\Delta$y1)=(Blx1−SBx, Bly1−SBy) between chromaticity coordinates (Blx1, Bly1) at which the first liquid crystal display panel 110 displays black ($0^{th}$ gradation) and the chromaticity coordinates of black (SBx, SBy) of the light blocking layer 204 of the decorative member 200 increases, and the boundary BL between the display region 210 and the non-display region 220 may become more visible.

Figure 23:
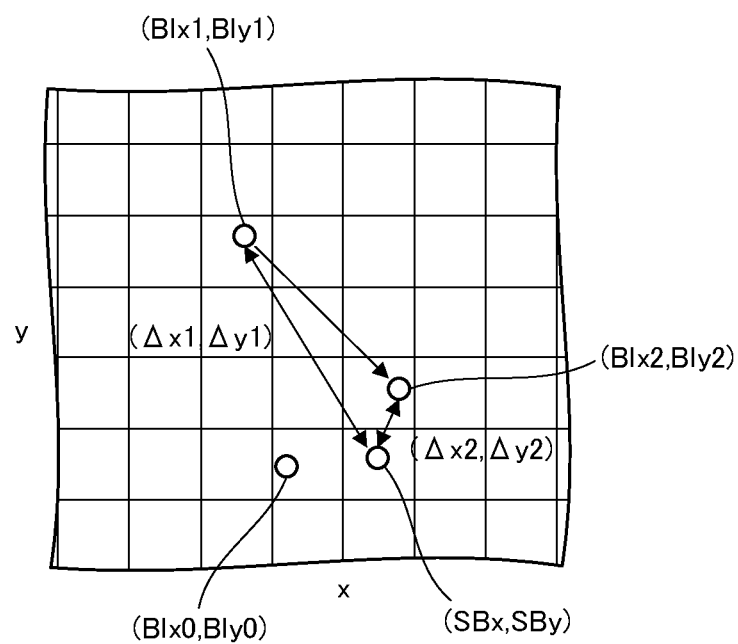
FIG. 23 is a drawing illustrating an example of a chromaticity coordinates of black according to Embodiment 8.

When, as illustrated in FIG. 23, the first liquid crystal display panel 110 displays black, a color corrector 335 of the present embodiment adjusts luminance values of sub pixels so as to reduce a chromaticity difference (Δx2, Δy2) between chromaticity coordinates of black (Blx2, Bly2) and chromaticity coordinates of black (SBx, SBy) of the light blocking layer 204 of the decorative member 200 to generate first color correction data by sub pixel. It is preferable that the chromaticity difference (Δx2, Δy2) is a chromaticity difference that is invisible to the user. The other configurations of the present embodiment are the same as described in Embodiment 5.

In the present embodiment, a luminance through the decorative member 200 of the black display (the $0^{th}$ gradation) of the first liquid crystal display panel 110 is controlled to the luminance of the non-display region 220 of the decorative member 200, and the chromaticity of black is also controlled. Accordingly, the display device 10 of the present embodiment can make the boundary BL between the display region 210 and the non-display region 220 even less visible.

Modified Examples

Embodiments have been described, but various modifications can be made to the present disclosure without departing from the spirit and scope of the present disclosure.

For example, the first liquid crystal display panel 110 and second liquid crystal display panel 130 are not limited to horizontal electric field type liquid crystal display panels, A configuration is possible in which the type of the first liquid crystal display panel 110 and the second liquid crystal display panel 130 is a vertical alignment (VA) mode, a twisted nematic (TN) mode, or the like. A configuration is possible in which the first liquid crystal display panel 110 of Embodiments 1 to 4 is a color liquid crystal display panel that displays color images.

In Embodiments 1 to 5, the controller 300 controls the luminance of the $1^{st}$ gradation to the minimum luminance Lmin visible to the user. It is sufficient that the controller 300 controls the luminance of the $1^{st}$ gradation to a luminance visible to the user (a luminance greater or equal to the minimum luminance Lmin). Additionally, it is sufficient that the controller 300 controls the luminance of a desired gradation of the low-gradation region and later (for example, the $1^{st}$ to 16th gradations of 256 gradations), except for black, to a luminance visible to the user.

In Embodiments 1 to 3 and Embodiments 5 to 8, a configuration is possible in which the controller 300 controls the luminance through the decorative member 200 of the $1^{st}$ gradation in accordance with the brightness of the external light, as in Embodiment 4.

It is preferable that the detector 500 is black, except for a light-receiving surface that receives the external light. Such a configuration will make the detector 500 less visible to the user.

In Embodiment 8, the chromaticity of the black display ($0^{th}$ gradation) of the first liquid crystal display panel 110 is adjusted to the chromaticity coordinates (Blx2, Bly2). A configuration is possible in which, in the display device 10, the chromaticity coordinates of black (SBx, SBy) of the light blocking layer 204 of the decorative member 200 are brought near the chromaticity coordinates (Blx1, Bly1) of the black display of the first liquid crystal display panel 110. As a result, the display device 10 can make the boundary BL between the display region 210 and the non-display region 220 even less visible.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:
1. A display device, comprising:
a liquid crystal display including a first liquid crystal display panel configured to display a character or an image;
a decorative member that is disposed on a display surface side of the liquid crystal display,
wherein the decorative member includes a display region in which a display of the liquid crystal display may be transparently displayed and a non-display region adjacent to the display region; and
a controller configured to control the display of the liquid crystal display,
wherein the controller is configured to control a luminance through the decorative member of a gradation equal to or less than a predetermined gradation of input data representing the character or the image, of the liquid crystal display to a luminance invisible to a user, and
wherein the controller is configured to control the luminance through the decorative member of a gradation region whose gradation is greater than the predetermined gradation, of the liquid crystal display to a luminance visible to the user.

2. The display device according to claim 1, wherein:
the liquid crystal display includes a back light that is provided on a back surface side of the first liquid crystal display panel, and that is configured to emit light on the first liquid crystal display panel,
the back light includes a plurality of emission regions that respectively correspond to a plurality of regions of the first liquid crystal display panel and that are configured to emit the light on each of the plurality of regions of the first liquid crystal display panel, and
the controller is configured to control the light emitted from each of the emission regions to control a luminance of the light emitted on a main pixel, that displays the gradation equal to or less than the predetermined gradation, of the first liquid crystal display panel to a luminance at which the luminance through the decorative member of that displays the gradation equal to or less than the predetermined gradation is the luminance invisible to the user.

3. The display device according to claim 1, wherein:
the liquid crystal display includes a second liquid crystal display panel that is provided on a back surface side of the first liquid crystal display panel and that is configured to display a monochrome image, and a back light that is provided on a back surface side of the second liquid crystal display panel and that is configured to emit light toward the first liquid crystal display panel and the second liquid crystal display panel, and
wherein the controller is configured to control a display of the second liquid crystal display panel to control a luminance of the light emitted on a main pixel, that displays the gradation equal to or less than the predetermined gradation, of the first liquid crystal display panel to a luminance at which the luminance through the decorative member that displays the gradation equal to or less than the predetermined gradation is the luminance invisible to the user.

4. The display device according to claim 1, further comprising:
a detector configured to detect external light,
wherein the controller is configured to control, in accordance with a brightness of the external light detected by the detector, the luminance through the decorative member of the gradation region whose gradation is greater than the predetermined gradation, of the liquid crystal display to the luminance visible to the user.

5. The display device according to claim 1, wherein:
the first liquid crystal display panel includes a plurality of sub pixels corresponding to mutually different colors, and a main pixel arranged in a matrix, and
the controller is configured to control a luminance of each of the sub pixels in accordance with a color of the decorative member.

6. The display device according to claim 1, wherein the controller is configured to, when increasing the luminance through the decorative member of a gradation subsequent to the predetermined gradation, increase the luminance through the decorative member of the subsequent gradation and later, of the liquid crystal display by an increased amount of the luminance through the decorative member of the subsequent gradation.

7. The display device according to claim 1, wherein:
the gradation region whose gradation is greater than the predetermined gradation is a gradation region whose gradation is a 1st gradation and later, and
the controller is configured to control the luminance through the decorative member of the $1^{st}$ gradation of the liquid crystal display to the minimum luminance visible to a user.

8. The display device according to claim 1, wherein the predetermined gradation displays the character or the image in black to the user.

9. The display device according to claim 8, wherein when a maximum gradation of the input data is 16 gradations, the gradation region whose gradation is higher than the predetermined gradation is a gradation region whose gradation is a 1st gradation and later.

* * * * *